July 25, 1950                H. J. KENT               2,516,703
PITCHER
Filed July 1, 1946
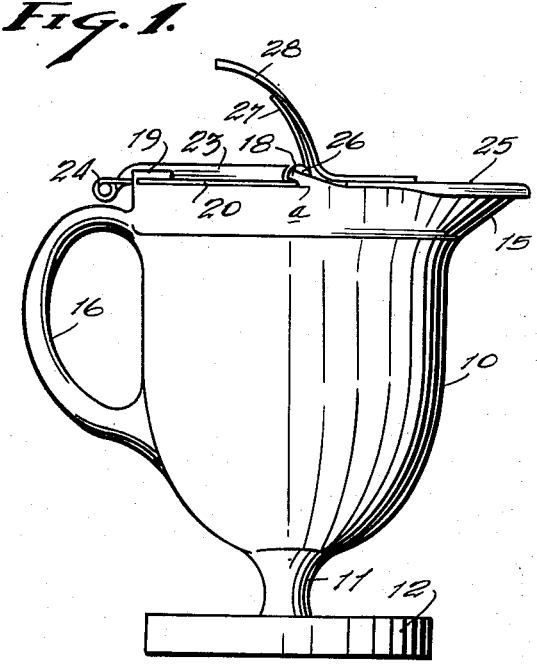
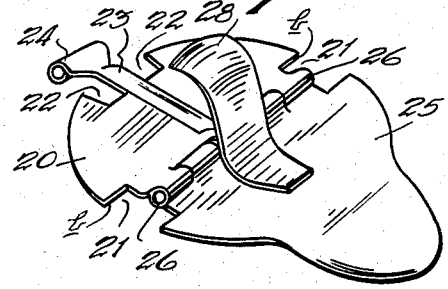
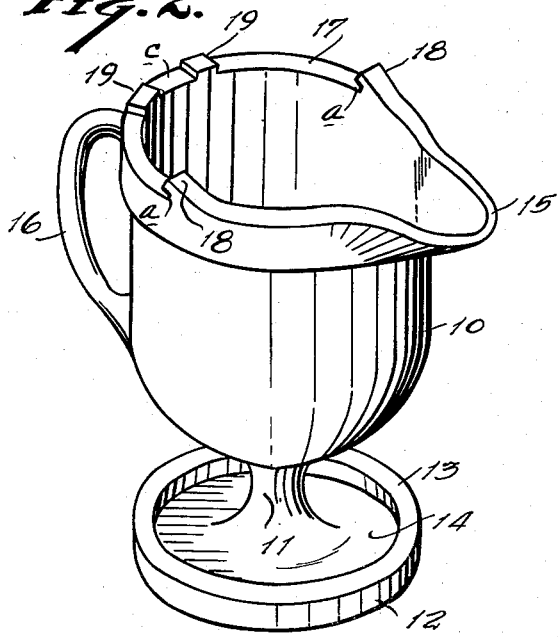
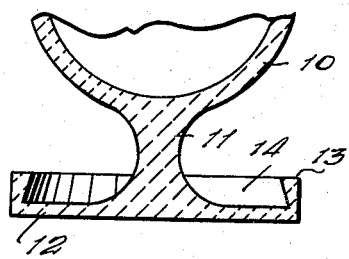
HERBERT J. KENT
INVENTOR.
BY *Cecil L. Wood*
ATTORNEY Patented July 25, 1950

2,516,703

UNITED STATES PATENT OFFICE 2,516,703

PITCHER

Herbert J. Kent, Fort Worth, Tex.

Application July 1, 1946, Serial No. 680,591

2 Claims. (Cl. 65—31)

This invention relates to dispensing receptacles, such as pitchers, conventionally employed for the purpose of dispensing such edible commodities as syrup, cream, or the like, and it has for its principal object the provision of a receptacle or pitcher of unique design which may be of any suitable material and attractively ornamented and provided with a novel cover which may be readily detachable for cleaning, or the like, and which is conveniently operated to open and close the pitcher for dispensing fluids therefrom.

Another object of the invention resides in the provision of a dispensing receptacle in which a drip receptacle is incorporated into its base affording means for preventing drippings of the contents from dropping on surfaces on which the receptacle is placed, such as table covers, while the device is in use.

Broadly, the invention seeks to comprehend the provision of an attractively designed dispensing pitcher in which its contents are protected against contamination and thus providing for complete sanitation in protecting the contents of the receptacle as well as the surfaces upon which the receptacle is placed.

While the foregoing objects are paramount, other and lesser objects will become manifest as the description proceeds taken in connection with the appended drawings, wherein:

Figure 1 is a side elevational view of the invention illustrating the base receptacle and the removable hinged cover.

Figure 2 is a perspective illustration of the invention, the cover being removed, showing the integral keepers formed on the upper rim by which the cover is retained in position thereon, and the paired, spaced lugs arranged rearwardly of the rim and above the handle.

Figure 3 is a perspective illustration of the hinged cover, illustrating the cut-out portion engageable with the keepers and the lugs, shown in Figure 2, and Figure 4 is a fragmentary vertical section through the base portion of the invention illustrating the annular receptacle formed in the said base.

Accordingly, therefore, the invention comprises a globular receptacle 10 formed with a supporting stem 11 connecting the same with a circular base 12 which has an annular rim 13, shown particularly in Figures 2 and 4, providing a drip receptacle 14 to receive the drippings of the contents from the spout 15. A handle 16 is formed on the receptacle 10, as shown in Figures 1 and 2.

The upper rim 17 of the receptacle 10 has integral keepers 18 arranged oppositely on each side, as shown particularly in Figure 2. The keepers 18 are directed rearwardly of the rim 17 and provide horizontally arranged recesses $a$ therebeneath whose function will presently become manifest. A pair of spaced lugs 19, projecting slightly above the rim 17, are arranged integrally of the latter at the rear of the receptacle opposite the spout 15.

The cover, illustrated in perspective in Figure 3, comprises a normally stationary portion 20 which generally conforms in shape to the rear portion of the rim 17 and has angular recesses 21 formed on each side, the edges $b$, when the cover is placed on the rim 17 of the receptacle 10, extending beneath the keepers 18 and into the recesses $a$ thereon, as in Figure 1, and spaced angular recesses 22 are arranged on the rear side of the member 20 which are engageable with lugs 19 of the rim 17, as in Figure 1.

Projecting rearwardly from the cover portion 20 is an integral member 23 which normally reposes in the space $c$ between the lugs 19 on the rim 17, and its extremity is formed into a convenient handle or lever 24 by which the cover portion 20 can be raised and removed from the keepers 18 for cleaning or for filling the receptacle 10. A manually operated lid portion 25 of the cover assembly is hinged at 26 to the member 20 and a spring 27 is arranged on the hinge 26 and extends upwardly behind a thumb lever 28 which imposes a constant tension on the latter, normally retaining the lid portion 25 closed, as in Figure 1. The tension imposed by the spring 27 also aids in retaining the cover portion 20 in its position upon the rim 17 in the manner previously described. The lid portion 25 is conformable to the shape of a spout 15 of the container 10 and its forward periphery is preferably turned down, as in Figure 1, to provide a protection for the rim of the spout 15.

Manifestly, the structure herein shown and described is capable of considerable changes and modifications without departing from the spirit and intent of the invention or the scope of the appended claims.

What is claimed is:

1. In a dispensing container, in combination with a pitcher having a pouring spout and formed with a handle and a base providing an annular receptacle, diametrically opposed integral keepers formed on each side of the upper rim of said pitcher, each having recesses in their rearmost sides, a pair of lugs formed at the rear of said rim and spaced on each side of said handle, a hinged lid member conformable to the top of said pitcher and spout, and having opposing rectangular peripheral recesses engageable with said lugs and said keepers, a portion of said lid detachably securable by said keepers and said lugs, said portion having a projecting member reposing between said lugs and providing means for manually removing said lid.

2. In a cover for a dispensing container, in combination with a pitcher having a pouring spout and formed with a handle and a base forming a drip receptacle, a pair of lugs formed on the rim of said pitcher and spaced on each side of said handle, keeper members formed on diametrically opposite sides of the rim of said pitcher and extending rearwardly therealong, defining recesses in their rearmost ends, a hinged cover on said pitcher having a rigid section and an operative section, the said rigid section having an integral portion projecting rearwardly thereof and reposing between said lugs to retain said rigid section, said operative section having a spring associated therewith normally retaining same closed, peripheral recesses formed in said cover embracing said lugs and said keepers removably securing said cover.

HERBERT J. KENT.

REFERENCES CITED

The following references are of record in the file of this patent:

UNITED STATES PATENTS

| Number | Name | Date |
|---|---|---|
| 87,318 | Ballinger | Mar. 2, 1869 |
| 166,350 | Dodge | Aug. 3, 1875 |
| 357,122 | Frey | Feb. 1, 1887 |
| 406,238 | Scott | July 2, 1889 |
| 1,084,306 | Whipple | Jan. 13, 1914 |
| 1,149,445 | Holmes | Aug. 10, 1915 |
| 1,199,774 | Fischer et al. | Oct. 3, 1916 |
| 1,365,145 | Baron | Jan. 11, 1921 |
| 1,389,732 | Baron | Sept. 6, 1921 |

FOREIGN PATENTS

| Number | Country | Date |
|---|---|---|
| 13,890 | Great Britain | June 18, 1906 |